No. 611,802. Patented Oct. 4, 1898.
E. TAYLOR.
TOOL FOR JOINING BICYCLE TUBES.
(Application filed Feb. 17, 1897.)
(No Model.)
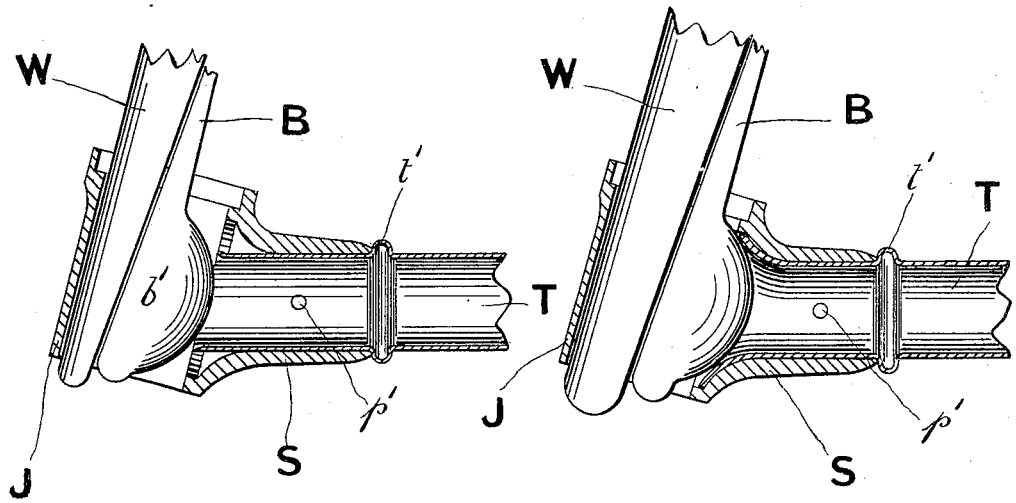
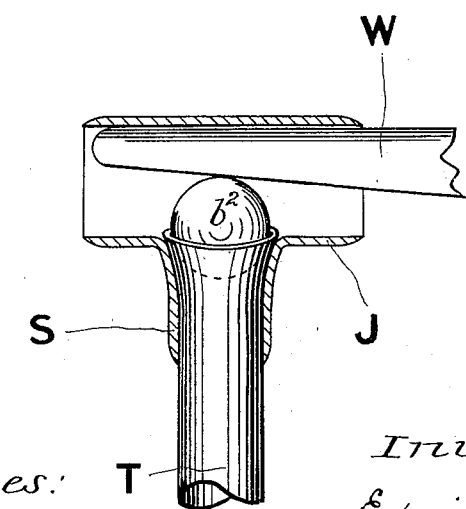
Witnesses:
E. B. Bolton
Inventor:
Edwin Taylor
By Richards
his Attorneys.

UNITED STATES PATENT OFFICE.

EDWIN TAYLOR, OF BIRMINGHAM, ENGLAND.

TOOL FOR JOINING BICYCLE-TUBES.

SPECIFICATION forming part of Letters Patent No. 611,802, dated October 4, 1898.

Application filed February 17, 1897. Serial No. 623,880. (No model.) Patented in England January 19, 1897, No. 1,410.

*To all whom it may concern:*

Be it known that I, EDWIN TAYLOR, stamper and piercer, a subject of the Queen of Great Britain, residing at 1 Alfred street, Warstone lane, Birmingham, in the county of Warwick, England, have invented certain new and useful improvements in tools for forming the junctions of tubes or members in building cycles and motor-car frames and the like, by which means I can easily and expeditiously expand the tubes so as to securely hold them in their sockets or junctions without the use of solder or brazing, of which the following is a specification.

This invention has been patented to me in England under date of January 19, 1897, No. 1,410.

In order that my invention may be clearly understood and more easily carried into practical effect, I have appended hereunto a sheet of drawings, upon which I have illustrated several examples of my methods for expanding tubes in their junctions or sockets.

The invention is illustrated in the accompanying drawings, in which—

Figure 1 is a sectional view through two adjoining tubes of a bicycle, showing the tool in the position assumed just prior to expanding the end of one tube. Fig. 2 is a similar view after the completion of the expanding operation. Fig. 3 is a view of a modified form.

Referring to Figs. 1 and 2, T represents the tube of a bicycle which is to be expanded within the socket S, and this is accomplished by the tool B, which has an enlargement or spherical face $b'$ at the end, which is forced into the mouth of the tube by the wedge-tool W, moving approximately at right angles or transversely to the tube to be expanded.

Instead of a tool, as shown at B, I may use a ball $b^2$, as shown in Fig. 3.

Having now particularly described and ascertained the nature of my said invention and in what manner the same is to be performed, I declare that what I claim is—

1. A device for expanding the end of a tube within a socket in cycle construction comprising a member having a spherical face and a wedge adapted to move approximately at right angles to the tube to be expanded to drive the rounded face within the tube end, substantially as described.

2. A device for expanding the ends of tubes within the sockets in cycle construction comprising a member having an enlargement or swell adapted to enter the mouth of the tube to be expanded, and a wedge adapted to be driven in beside said first member at approximately right angles to the tube to be expanded to force it against the tube end, substantially as described.

In testimony that I claim the foregoing as my own I affix my name in the presence of two witnesses.

EDWIN TAYLOR.

Witnesses:
 THOMAS MARSTON,
 GEORGE LESTER.